(12) United States Patent
Schnell

(10) Patent No.: US 6,789,735 B1
(45) Date of Patent: Sep. 14, 2004

(54) DEVICE FOR CODING AND MARKING OBJECTS

(75) Inventor: Wolfgang Schnell, Hamburg (DE)

(73) Assignee: Phoenix AG, Hamburg (DE)

( * ) Notice: Subject to any disclaimer, the term of this patent is extended or adjusted under 35 U.S.C. 154(b) by 0 days.

(21) Appl. No.: 09/937,696

(22) PCT Filed: Apr. 7, 2000

(86) PCT No.: PCT/DE00/01103
§ 371 (c)(1), (2), (4) Date: Sep. 28, 2001

(87) PCT Pub. No.: WO00/65533
PCT Pub. Date: Nov. 2, 2000

(30) Foreign Application Priority Data

Apr. 26, 1999 (DE) .......................................... 199 18 933

(51) Int. Cl.[7] .................................................. G06K 7/08
(52) U.S. Cl. ....................... 235/449; 235/375; 235/493; 428/192
(58) Field of Search ................................. 235/375, 449, 235/493, 492, 494, 462.01; 428/192; 399/301, 303

(56) References Cited

U.S. PATENT DOCUMENTS

| 5,051,034 A | | 9/1991 | Goodman |
|---|---|---|---|
| 5,325,154 A | * | 6/1994 | Tayama et al. ............. 399/301 |
| 5,627,649 A | * | 5/1997 | Sawayama et al. ......... 358/296 |
| 5,762,461 A | | 6/1998 | Frohlingsdorf |
| 5,984,176 A | * | 11/1999 | Koda et al. .................. 235/376 |
| 6,330,404 B1 | * | 12/2001 | Munenaka et al. ............ 399/51 |
| 6,360,070 B1 | * | 3/2002 | Taka et al. ................... 399/301 |
| 6,381,435 B2 | * | 4/2002 | Shinohara et al. .......... 399/301 |
| 6,382,515 B1 | * | 5/2002 | Good et al. ............. 235/462.01 |

FOREIGN PATENT DOCUMENTS

| DE | 41 00 222 | 7/1992 |
|---|---|---|
| DE | 196 20 582 | 11/1997 |

OTHER PUBLICATIONS

TIRIS Edition (Oct. 1993) "Transponder", 4 pages.

* cited by examiner

Primary Examiner—Michael G. Lee
Assistant Examiner—Ahshik Kim

(57) ABSTRACT

A device for coding and making conveyor belts. A conveyor belt made of plastic, rubber or rubber-like material has a carrying side and a running side. A coding and marking system is completely embedded in an edge of the carrying or running side of the conveyor belt, such that the profile and function of the belt are not impaired. The coding and marking system includes a plurality of detectable material particles fixedly embedded in a matrix of plastic, rubber or a rubber-like material. The particles are completely enclosed in the matrix and disposed at predetermined locations relative to one another. A static scanner reads and detects the particles as the conveyor belt moves past the scanner.

5 Claims, 3 Drawing Sheets

DEVICE FOR CODING AND MARKING OBJECTS

Applicant claims priority under 35 U.S.C §119 of German Application No. 119 18 933.1 filed Apr. 1, 26, 1999. Applicant also claims priority under 35 U.S.C. §365 of PCT/DE00/01103 filed Apr. 7, 2000. The international application under PCT article 21(2) was not published in English.

BACKGROUND OF THE INVENTION

1. Field of the Invention

The invention relates to a device for coding, i.e. for the identification and addressing as well as marking of objects, in particular of objects made of plastic, rubber or materials similar to rubber, whereby the device comprises the following components, specifically

- a coding and marking system; as well as
- a scanner unit (detector) for the non-contact recognition and readout of the coding and marking.

2. Prior Art

It is often necessary to equip objects (products) with permanent identifications or markings, for example in order to identify (address) certain locations on such objects, or to provide such objects with a clear identification code or also with a date of manufacture. With suitable detection, such markings can be used both for the identification of the object, a defined location on such an object, and also for measuring, regulating and controlling purposes. For example, switching processes can be triggered or certain measurements can be carried out, and can be associated with a defined address that is generated by the marking system. The address or the code itself can be used in this connection as the trigger; however, other triggers can serve for said purpose in connection with the code as well. A logical linking of the coding system with other signals that can be registered such as measured values or the date or time is possible as well.

Now, a device of the type specified above is introduced in patent DE 41 00 222 C2. A container is shown within the framework of FIG. 1 of said patent. The coding and marking system is located on the outer wall of said container similar to a bar code identification. The recognition and readout of the coding and marking take place without contact on the stationary object, notably by means of a scanner unit that is in the stationary condition as well. Now, if the coding and marking system attached to the surface of the object is damaged by rough conditions of use or even due to willful or malicious manipulation, the system is no longer capable of functioning, or can function only to a limited extent.

Other addressing or marking methods such as those operating by means of transponders (TIRIS, edition Oct. 1993) start to fail at a certain speed because the reading process takes too long and the transponder has already left the range of the receiving antenna before its transmitted signal has been completely transmitted. The transponder technology can be employed for technical measuring purposes on a fast-moving product only to a highly limited extent.

SUMMARY OF THE INVENTION

Therefore, the problem of the invention is to provide a device that excludes the drawbacks described above. Furthermore, the goal is that the device can be employed universally, i.e. that it is available for a wide spectrum of different types of product. Furthermore, the recognition and readout of the coding and marking must take place with great exactness in terms of time even if the object is moving at high speed irrespective of whether the movement takes place in a translocating or rotating manner.

Said problem is solved according to an embodiment of the invention in that

- the coding and marking system is completely embedded in the object, notably in a manner such that that neither the outer shape nor the function are impaired; and that, furthermore,
- the scanner unit is moved past the stationary object, or alternatively the object is moved past the stationary scanner unit.

With respect to the embedding of the coding and marking system in the object, particularly the following two variations (A, B) are advantageous:

Variation A

The coding and marking system comprises a matrix in particular made of plastic, rubber or a material similar to rubber, that is embedded in the object, whereby detectable material particles, in particular small pieces of metal, permanent magnets or in particular dense or light plastic particles are in turn embedded in the matrix with an exactly fixed spacing in relation to each other and with good adhesion and in an undisplaceable manner.

A code can be generated based on the number and/or the spacing of the material particles (binary code).

The embedded material particles are embedded with adaptation to the intended movement of the object or the scanner unit. For example, an arrangement in rows is selected with a linear movement, whereas a circular arrangement is selected in connection with a rotational movement.

The special feature of the permanent magnets is discussed in greater detail in the following in connection with the description of the figures.

Variation B

The coding and marking system comprises a matrix in the present case as well, in particular a matrix made of plastic, rubber or a rubber-like material that is embedded in the object; however, as opposed to variation (A), a material that can be magnetized is admixed to the matrix, in particular a ferrite material, preferably with uniform distribution.

A code can be written in and also erased again in this connection by suitable magnetizing methods in a manner similar to magnetic tapes or magnetic disks or diskettes.

According to both variations (A, B), the matrix itself is adapted to the material-specific properties. If, for example, the object consists of the weather-resistant elastomer material EPDM (ethylene-propylene-diene copolymer), the matrix is structured from said material as well. Furthermore, the matrix is advantageously present in a form (strips, circular segments, cylindrical segments) that can be easily worked into the object involved as the latter is being produced. In this way, the coding and marking system is completely embedded in the object, forming one unit with the latter, which is entirely opposed to the superficial coding and marking according to DE 41 00 222 C2.

The coding and marking system is arranged within the object in one or more discrete zones. The number, position and size of said zone or zones are dependent in this connection upon the size, shape and purpose of application of the object.

The device as defined by the invention is employed especially for coding and marking

- conveyor belts and conveyor belt connections;
- tubular bodies in particular such as hoses, hose connections and compensators; as well as profiled bodies, in particular large profiles, and particularly again fenders for ships;
and thus for products that heretofore have been accessible to a form of coding and marking only to a limited extent.

All physical principles by means of which the embedded material can be detected in terms of measurement technology are suitable for the detection by means of the scanner unit. Metal particles can be detected by means of inductive methods such as, for example the eddy current method, radar waves or microwaves, or by means of ionized radiation by the through-radiation method. Dense or light plastic particles can be detected by means of ionized radiation (x-rays or y-radiation) as well, or by means of ultrasound.

Reference is made to the description of the figures with respect to the detection of permanent magnets.

BRIEF DESCRIPTION OF THE DRAWINGS

The invention is explained in the following with the help of exemplified embodiments and by reference to schematic drawings, in which.

The following list of reference symbols applies in association with the above figures:

| | |
|---|---|
| 1, 1', 1", 1''' | Coding and marking system |
| 2, 2'2" | Embedded material particles (e.g. metal pieces) |
| 2''' | Embedded permanent magnets |
| 3, 3', 3", 3''' | Matrix |
| N | North magnetic pole |
| S | South magnetic pole |
| ↑ | Direction of magnetic field lines (fixed at random) |

DETAILED DESCRIPTION OF THE INVENTION

Figure 1:
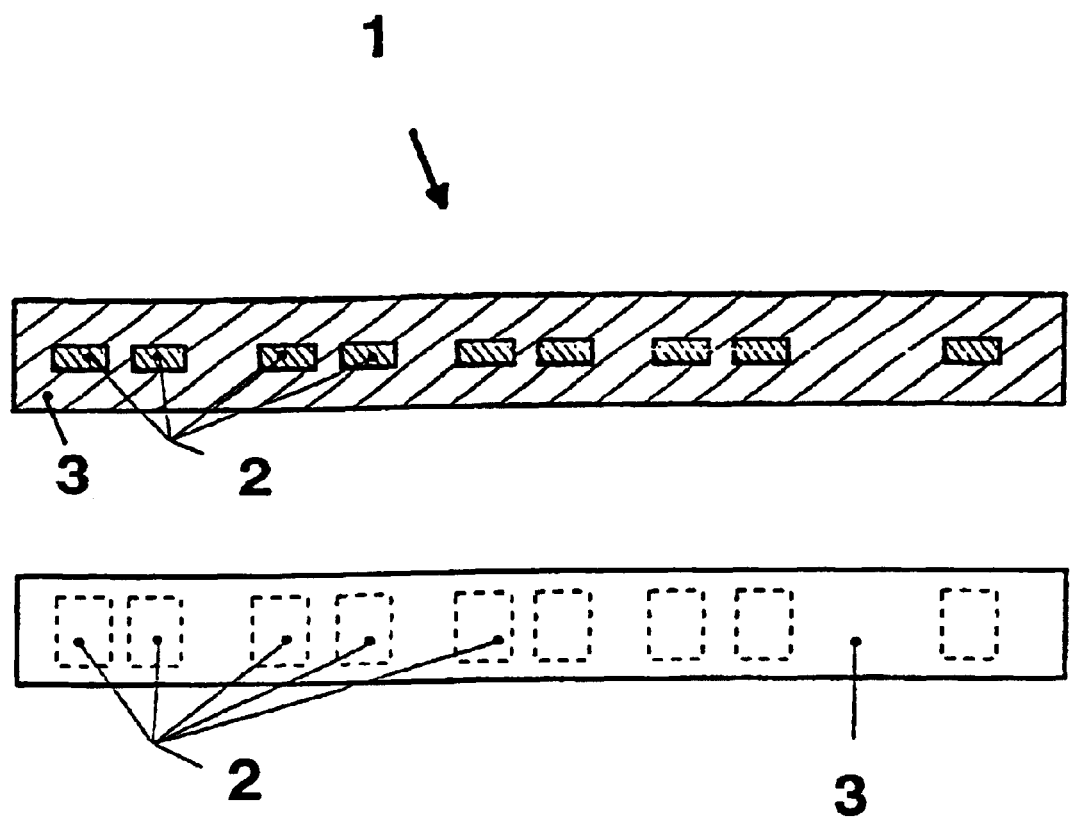
FIG. 1 shows a cross section and a top view of a coding and marking system in the form of a strip.

FIG. 1 shows a coding and marking system 1 in the form of a strip. The embedded material particles 2, for example pieces of metal, represent a code by their number and the pattern of their arrangement (row arrangement). The matrix 3, which completely encloses the material particles, is adapted to the object in terms of its material.

Said shape of a strip is used in particular with conveyor belts and conveyor belt connections, whereby the coding and marking system 1 is in this case advantageous embedded within the zone of the edge of the carrying and/or running side of the conveyor belt, if necessary embedded a number of times at defined intervals in the longitudinal direction of the conveyor belt.

Figure 2:
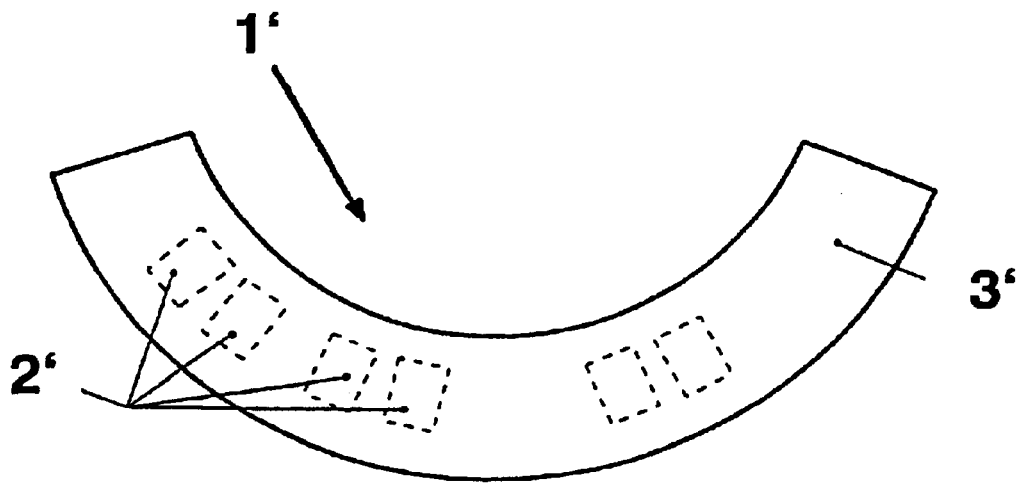
FIG. 2 shows a top view of a coding and marking system in the form of a circular segment.

According to FIG. 2, the coding and marking system 1' has the form of a circular segment, whereby the material particles 2' forming a code also in the present case are completely embedded in the matrix 3'.

A special purpose of application in the present case are flange-shaped hose connections.

Figure 3:
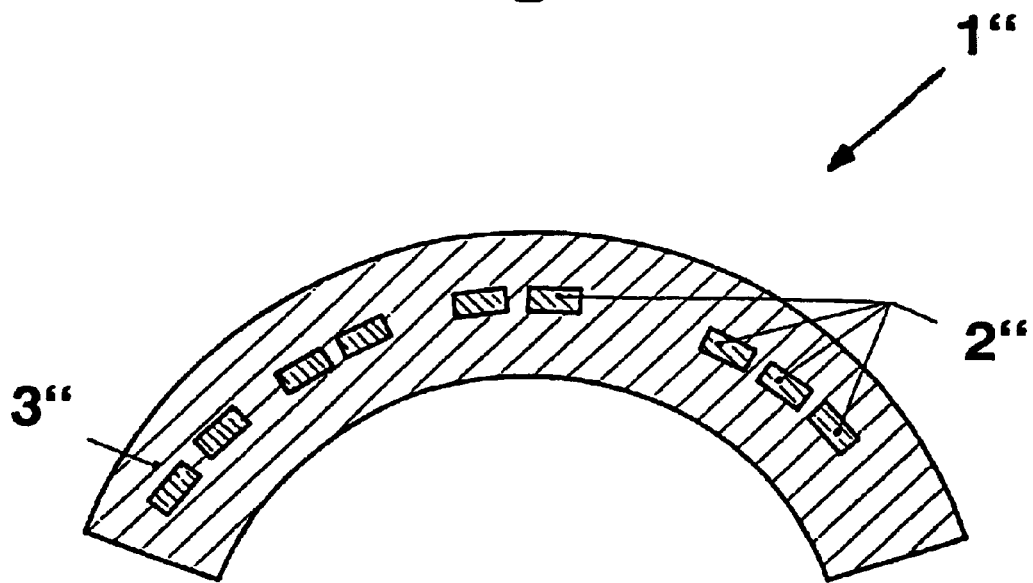
FIG. 3 shows a cross section of a coding and marking system in the form of a cylindrical segment.

FIG. 3 shows a coding and marking system 1" present in the form of a cylindrical segment. The material particles 2" representing a code in the present case as well are embedded in the matrix 3" here as well.

Said embodiment is preferably applied in conjunction with hoses, whereby the coding and marking system 1" is particularly embedded within the top layer of the hose, if necessary at defined intervals in the longitudinal direction of the hose.

Figure 4:
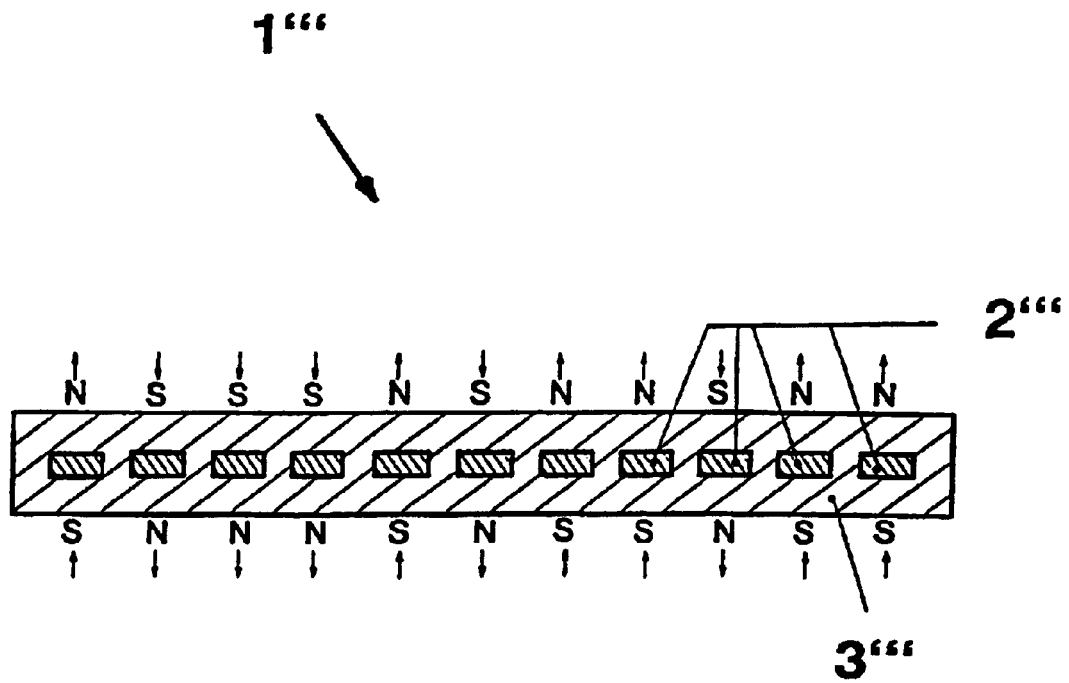
FIG. 4 shows a cross section of a coding and marking system in the strip form, using a permanent magnet.

According to FIG. 4, the permanent magnets 2''' are embedded in the strip-shaped matrix 3''', notably with formation of the coding and marking system 1'''.

A code based on three different conditions can be generated with the permanent magnets as well, specifically as follows: north magnetic pole n directed at the detector, south magnetic pole S directed at the detector and no magnet present. Permanent magnets can be detected by means of all commonly used magnet-sensitive methods, for example such as magnetic inductive methods, magnetoresistive sensors, or sensors based on the hall effect, to mention a few.

What is claimed is:

1. A device for coding and marking conveyor belts, the device comprising:
   (a) a conveyer belt made of plastic, rubber or a rubber-like material, said conveyor belt comprising a carrying side and a running side;
   (b) a coding and marking system completely embedded in an edge region of said carrying side or an edge region of said running side of said conveyor belt such that a profile and function of said conveyor belt is not impaired, said coding and marking system comprising:
      (i) a matrix made of plastic, rubber or a rubber-like material; and
      (ii) a plurality of detectable material particles fixedly embedded in said matrix, wherein said plurality of detectable material particles is completely enclosed within said matrix and each of said plurality of detectable material particles is disposed at a predetermined fixed location with respect to each other of said plurality of detectable material particles; and
   (c) a static scanner unit for contact-free reading and detecting of said plurality of detectable material particles when said conveyor belt is moved passed said static scanner unit.

2. The device according to claim 1, wherein said plurality of detectable material particles comprise a magnetizable material admixed with and uniformly distributed in said matrix.

3. The device according to claim 1, wherein said matrix comprises a material with substantially similar properties to said conveyor belt.

4. The device according to claim 1, wherein said coding and marking system has a form of a strip.

5. The device according to claim 1, wherein said coding and marking system is embedded in said conveyor belt at one or more discrete zones.

* * * * *